(12) United States Patent
De Vos et al.

(10) Patent No.: US 8,774,598 B2
(45) Date of Patent: Jul. 8, 2014

(54) METHOD, APPARATUS AND SYSTEM FOR GENERATING MEDIA CONTENT

(75) Inventors: Kurt De Vos, Erpe (BE); Philip Marivoet, Tienen (BE); Vanessa Schelkens, Heverlee (BE); Daniel Clarke, Curracloe (IE)

(73) Assignees: Sony Corporation, Tokyo (JP); Sony Europe Limited, Weybridge (GB)

( * ) Notice: Subject to any disclaimer, the term of this patent is extended or adjusted under 35 U.S.C. 154(b) by 422 days.

(21) Appl. No.: 13/074,749

(22) Filed: Mar. 29, 2011

(65) Prior Publication Data

US 2012/0251082 A1    Oct. 4, 2012

(51) Int. Cl.
| H04N 9/80 | (2006.01) |
| H04N 5/93 | (2006.01) |
| G11B 27/00 | (2006.01) |
| H04N 5/765 | (2006.01) |
| H04N 9/82 | (2006.01) |

(52) U.S. Cl.
CPC .......... *H04N 5/765* (2013.01); *H04N 9/8205* (2013.01); *H04N 9/8211* (2013.01)
USPC ............................. 386/248; 386/239; 386/240

(58) Field of Classification Search
CPC ... H04N 5/765; H04N 9/8205; H04N 9/8211; G11B 27/10; G11B 27/32
USPC .................. 386/239–248, 278–290
See application file for complete search history.

(56) References Cited

U.S. PATENT DOCUMENTS

| 7,333,864 | B1 * | 2/2008 | Herley | 700/94 |
| 7,913,273 | B2 * | 3/2011 | Del Beccaro et al. | 725/31 |
| 2007/0299983 | A1 * | 12/2007 | Brothers | 709/231 |
| 2009/0172200 | A1 * | 7/2009 | Morrison et al. | 709/248 |
| 2011/0304779 | A1 * | 12/2011 | Wada et al. | 348/739 |
| 2011/0311201 | A1 * | 12/2011 | Bodin et al. | 386/278 |

* cited by examiner

*Primary Examiner* — Gelek W Topgyal
(74) *Attorney, Agent, or Firm* — Oblon, Spivak, McClelland, Maier & Neustadt, L.L.P.

(57) ABSTRACT

A method of generating media content is described which comprises capturing still or moving image content items at a capture device and uploading the captured image content items and image content metadata indicating a time of capture of each of the image content items to a network. A playback log indicating playback times of audio content items listened to by the user of the capture device is stored. One or more of the captured image content items is correlated with one or more portions of the playback log based on the time of capture indicated by the metadata relating to the one or more captured content items and the playback times indicated by the playback log. A media output is generated as a collection of a plurality of the captured image content items stored at the network accompanied by audio content related to the portion of the playback log which is correlated with the captured image content items in the collection. In this way, a media output can be generated at a network, such as a cloud network, from user generated image content and commercial audio content which the user who captured the image content was listening to at the time the image content was captured.

24 Claims, 7 Drawing Sheets

METHOD, APPARATUS AND SYSTEM FOR GENERATING MEDIA CONTENT

BACKGROUND OF THE INVENTION

1. Field of the Invention

The present invention relates to a method and system for generating media content. Embodiments of the present invention relate to the selection of items of related user generated content for sharing or display to a device other than the device on which the content was captured, and the provision of an audio accompaniment for the user generated content.

2. Description of the Prior Art

It has been proposed that cloud computing could be used as a repository for both commercial content and user generated content. Commercial content may include for example music content or video content. Business rules or business models may dictate how users are able to obtain access to commercial content. For example music may be streamed to a user on request. This streamed music may be free to the user provided that he is willing to accept the streaming of advertisements along with the music, or to provide personal data in return for the streamed music. Alternatively, a time based subscription may apply, so for example a user may pay a particular sum per month to retrieve streamed music. There may be a capped limit of streamed items or the number of streamed items may be unlimited (optionally subject to a fair use policy). Items may be streamed according to user selection, or a recommendation engine as part of the cloud may dictate which content items are streamed. A user may be able to interact with the recommendation engine to influence its output.

Downloads of music items for example, for transfer to devices that do not have permanent network connectivity may be treated in a similar or different way. For example unlimited downloads may be permissible, or subject to a capped monthly limit, or there may be a charge per download. Downloads may be subject to Digital Rights Management (DRM) limitations, which for example allow a certain number of playbacks in a month, allow a certain number of transfers to distinct devices, or which allow or do not allow streaming across for example a DLNA (Digital Living Network Alliance) compliant home network.

A cloud network may also provide a convenient repository for user generated content such as images files and movie files. It can provide a mechanism for convenient access to such user generated content, since it is accessible from any device at any time and allows sharing of access rights to other users.

SUMMARY OF THE INVENTION

Viewed from one aspect, there is provided a method of generating media content, comprising:

receiving, at a network, still or moving image content items captured at a capture device and image content metadata indicating a time of capture of each of the image content items;

storing a playback log indicating playback times of audio content items listened to by the user of the capture device;

correlating one or more of the captured image content items with one or more portions of the playback log based on the time of capture indicated by the metadata relating to the one or more captured content items and the playback times indicated by the playback log; and generating a media output as a collection of a plurality of the captured image content items stored at the network accompanied by audio content related to the portion of the playback log which is correlated with the captured image content items in the collection.

In this way, a media output can be generated at a network, such as a cloud network, from user generated image content and commercial audio content which the user who captured the image content was listening to at the time the image content was captured. Typically, sets of images (photographs or videos) may relate to an event or experience, such as a holiday, of special significance for the user. With embodiments of the present invention, the resulting media output may, by including audio content items from or related to those listened to on the holiday to which the images relate, better convey the experience had by the user while he was taking the viewed images.

It will be appreciated that the playback times and times of capture may include not only a time of day of playback or capture, but also a date of playback or capture. For example, a playback time or a time of capture may be at 10:43 am on Saturday 26 Feb. 2011. Indeed, for the purposes of correlation, the time of day itself might not be used, with the correlation being conducted only on the date component of the time of playback or capture.

The collection of image content items in the media output may be displayed as a mashup, a slideshow, a single file, a timeline or a collage. Preferably, the image content items are arranged in a sequence, with the audio content items being provided to accompany the sequence of image content items.

It is expected that users of capturing devices such as mobile telephones, digital cameras and camcorders will upload user generated content to "the cloud". Metadata such as geo-location data may also be uploaded in association user generated content. Upload of data and metadata may be carried out directly for example where the capturing device has a built-in network connection such as 3G or 4G (LTE) network capability, or carried out indirectly by first transferring the content to a PC type device and then via an internet connection to the cloud.

In one example, the audio content to accompany the captured image content items of the collection or sequence may be selected in dependence on a category of audio item indicated in the portion of the playback log correlated with the captured image content items in the collection or sequence. The category of audio item may be one of an artist, genre or audio track. In this example, the audio content items listened to by the user serve as a guide for the type of content to accompany the captured images.

Alternatively, the audio content to accompany the captured image content items of the collection or sequence may be selected from the audio content items listened to by the user over one or more periods of time during which the image content items were captured based on the correlation between the image content metadata and the playback log. In this case, the audio content items which accompany the captured images will be ones of the actual audio content items listened to by the user during a period of time when the captured images were photographed. This may provide a particularly apt soundtrack to reflect the experience had by the user, but at the expense of flexibility in selecting audio content items to match the captured images.

The media output may be generated either for the user who captured the image content items, or for a different person. In the latter case, the media output may be provided from the network to a playback device of a different user for playback. The media could be obtained at the viewing device via an internet link which is operable to set up an Internet connection between the viewing device and the network. The internet link could be provided from the user who captured the image content to a different user in the form of an email. In the alternative, the media output could be stored on a recording medium such as a DVD and provided to a user in physical form.

The media output could be generated from all uploaded content items. In this case it would be assumed that the user pre-selected the most suitable photographs and only uploaded these to the network. However, preferably a plurality of the uploaded captured content items are selected for inclusion in the collection or sequence of image content items. In this case, the selected content items are correlated with one or more portions of the playback log corresponding to the time of capture indicated by the metadata relating to the one or more selected content items, and the media is generated as a collection or sequence of the selected image content items stored at the network accompanied by audio content related to the portion of the playback log which is correlated with the selected image content items in the collection or sequence. The step of selecting may be carried out by one of the capture device, a data processing device (such as a personal computer or a PDA) under the control of the user, and a playback device associated with a different user to which the media is to be provided.

The selection of the image content items may be by way of, for example, manually selecting from a series of thumbnail images, or may be a semi-automated process. For example, the step of selecting may be conducted by specifying one or more of a subject tag (indicating a particular holiday or tourist attraction for example), a geographical location, a time window and a still/moving image type (video or photo) as selection constraints, and by comparing the selection constraints with the image content metadata to identify image content items for selection. It will be appreciated that this may require the image metadata to include additional information such as a subject tag (user-entered) or GPS data (generated automatically by a GPS receiver) for example.

The selection of audio content items may be made in dependence on various different parameters relating to the image content items. For example, the picture data of uploaded image content items may be analysed and categorised based on the analysis. The audio content items may then be preferentially selected to accompany the collection or sequence of image content items when they have a category which matches the categorisation of the image content items in the collection or sequence. For example, such image analysis might determine that an image or a set of images relate to a beach scene or a sunset, which might make the selection of a relaxing genre of music appropriate to accompany those images.

The audio content items may be pre-categorised, or they may be categorised at the network by analysing their audio characteristics and categorising them based on the analysis. An example of such categorisation of audio content items by mood is provided by Sony's SensMe technology.

The audio content items to accompany the collection or sequence of image content items may be selected in dependence on a time of day at which the image content items were captured. This could be achieved by categorising the image content items by time of day based on the time of capture of the image content items indicated by said image metadata, and by preferentially selecting audio content items which have a time categorisation which matches the time categorisation of the image content items in the collection or sequence to accompany the collection or sequence of image content items. Again, an example of such categorisation of audio content items by time of day is provided by Sony's SensMe technology.

The image content metadata may comprise an indication of a geographical location at which each of the image content items was captured. Audio content items to accompany the collection or sequence of image content items may then be selected in dependence on the geographical location of capture of the image content items in the collection or sequence. For example, audio content items which were in a top 10 music chart in the country corresponding to the geographical location could be preferentially selected.

The image content metadata may also comprise other information relating to the captured images, such as an indication of whether the flash was used, a shutter time, panning information or other camera modes and settings. This information could be used to provide some information about the nature of the captured image. For example, where the flash has been used, this may indicate a picture taken indoors in a dim environment, or outdoors at night, and appropriate audio content items (for example night-time or lounge style music) may be selected on the basis of flash usage. Similarly, if a fast shutter time or "sports" camera mode has been used, this may indicate a fast moving subject for the image, which could be linked to a more dynamic music type, for instance with a faster tempo.

The playback log may be generated either at the network or at the playback device, depending on whether or not streaming audio delivery is being used. In particular, where audio content is being streamed from the network to the user, the playback log is likely to be generated at the network in dependence on the audio content streamed to the user. In contrast, where pre-stored audio content is played to the user at the playback device, the playback log will be generated at the playback device in dependence on the audio content played on the playback device, and then subsequently uploaded to the network.

The user may wish to apply special effects to one or more of the image content items. In this case, an audio content item may be selected to accompany the collection or sequence of image content items in dependence on a type of image processing effect applied to the image content item. For example, where a black and white or sepia effect is applied, 30 s or 40 s era music could be preferentially selected.

As mentioned above, the image content items may be still image content items or moving (video) image content items. In the case of video content, an amount of motion in the moving image content item may be detected, and one or more audio content items be selected to accompany the moving image content item in the media in dependence on an amount of motion detected in the moving image content items. For example, high tempo music such as dance or rave music could be set to accompany video content with fast motion, while slower paced music such as reggae or classical music could be set to accompany video content with slower motion. It will also be appreciated that other characteristics of video content might be taken into account in a similar fashion, such as a frequency of scene changes.

It is often the case that when video content is captured, a user will wish to edit it, either to cut out undesirable portions or to combine it with one or more other video clips. If such an editing process is undertaken, the media output may be generated in such a way as to align transitions between two subsequent audio content items at or near a cut point in the edited moving image content items. As a result, the image and audio components of the media output may appear more synchronised.

In some cases, it may be desirable to produce a media output which combines image content items captured by two or more different users. In this case, the method may further include:

receiving, at the network, still or moving image content items captured at one or more other capture devices and image content metadata indicating a time of capture of each of the image content items;

storing a playback log indicating playback times of audio content items listened to by the users of each of the one or more other capture devices;

correlating one or more of the image content items captured by the capture device and the one or more other capture devices with one or more portions of the playback logs associated with the users of the capture device and the one or more other capture devices based on the time of capture indicated by the metadata relating to the content items captured by the users of the capture device and the one or more other capture devices and the playback times indicated in the playback log; and generating the media as a collection of a plurality of the image content items captured by the capture device and the one or more other capture devices accompanied by audio content related to the portions of the playback logs which are correlated with the captured image content items in the collection.

Viewed from another aspect, there is provided a media content generation apparatus, comprising:

a network;

a capture device for capturing still or moving image content items and uploading the captured image content items and image content metadata indicating a time of capture of each of the image content items to a network; and an audio device for playing audio content items received from the network;

the network comprising:

a playback manager which stores a playback log indicating playback times of audio content items played by the audio device;

a correlation engine for correlating one or more of the captured image content items with one or more portions of the playback log based on the time of capture indicated by the metadata relating to the one or more captured content items and the playback times indicated by the playback log; and a media generation engine for generating media as a collection of a plurality of the captured image content items stored at the network accompanied by audio content related to the portion of the playback log which is correlated with the captured image content items in the collection.

It will be appreciated that the playback manager, correlation engine and media generation engine may be functions achieved by a processor. For example, the playback manager, correlation engine and media generation engine may be embodied in a processor configured to store a playback log indicating playback times of audio content items played by the audio device, to correlate one or more of the captured image content items with one or more portions of the playback log based on the time of capture indicated by the metadata relating to the one or more captured content items and the playback times indicated by the playback log, and to generate media as a collection of a plurality of the captured image content items stored at the network accompanied by audio content related to the portion of the playback log which is correlated with the captured image content items in the collection.

Preferably, both the capture device and the audio device are associated with the same user.

A playback device associated with a different user may also be provided within the system, and may be operable to obtain and playback the media generated by the media generation engine.

Viewed from another aspect, there is provided a server side apparatus, comprising a processor configured to:

interface with an image repository to obtain selected still or moving image content items captured by a capture device and uploaded to the image repository, and image content metadata indicating a time of capture of each of the selected image content items;

interface with a playback log indicating playback times of audio content items played on a playback device associated with the capture device;

correlate one or more of the captured image content items with one or more portions of the playback log based on the time of capture indicated by the metadata relating to the one or more captured content items and the playback times indicated by the playback log; and generate a media output as a collection of a plurality of the captured image content items stored at the network accompanied by audio content related to the portion of the playback log which is correlated with the captured image content items in the collection.

Viewed from yet another aspect there is provided a computer program product comprising computer readable instructions which, when loaded onto a computer configure the computer to perform the above methods.

BRIEF DESCRIPTION OF DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1A:
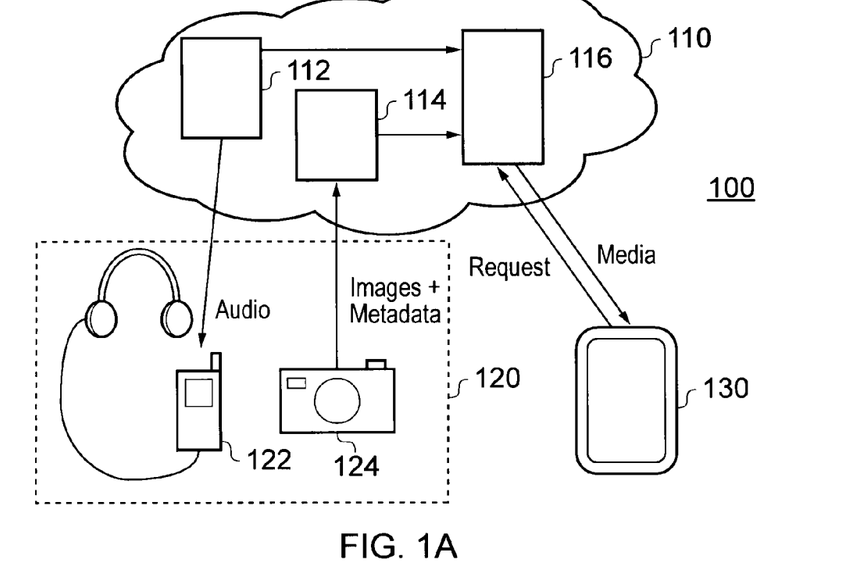
FIGS. 1A and 1B schematically illustrate example cloud network based commercial and user generated content management systems.

FIG. 1A schematically illustrates a system 100 comprising a cloud network 110, user A equipment 120 and a user B device 130. The user A equipment 120 includes a mobile phone 122, which has an audio playback function and headphones. The mobile phone receives streaming audio from an audio content manager 112 in the cloud network 110. The audio content manager 112 maintains an audio log for user A indicating the audio content items which have been streamed to the audio playback device 122 and are thus presumed to have been listened to by user A. The audio log will identify the streamed audio content item as well as a time and date when it was streamed to user A. Optionally, additional information about the streamed audio data may be stored in the audio log. The user A equipment 120 also includes a camera 124, which may have one or both of still image and moving image (video) capture capabilities. The user A is able to capture images on the camera 124, for example while on holiday, and to upload the captured images to a user content manager 114 in the cloud network 110. As well as uploading the images, the user A will upload metadata relating to the images to the user content manager 114. It will be understood that the upload of captured images and metadata could be conducted as an ongoing process whenever a wireless uplink (for example WiFi or a cellular network) is available to the camera 124, or could be initiated by the user at an appropriate time, for example following his or her return from the holiday. It is emphasised here that both the audio playback device 122 and the camera 124 are associated with the same user A. It will further be appreciated that mobile phones are increasingly being provided with high quality still image and moving image (video) capture functionality, and that the audio playback device 122 and the camera 124 could therefore be encapsulated in a single device such as a mobile phone.

In an example operation of the above system, user A travels to Iceland for a holiday with the camera 124 and the mobile telephone 122. User A shoots a number of content items (still images or moving images) whilst on holiday in Iceland. User A also enjoys listening to music whilst on holiday using the network delivered music system provided by the mobile telephone 122 and the audio content manager 112. Statistics on the music playback, in the form of an audio log, are stored by the audio content manager 122. This may be against particular songs, artists or genres for example.

Upon return from holiday, user A may wish to generate or share experiences with other users, in the present case a user B. User B in the present example is in possession of a media device 130, in this case a tablet PC. The user A may select the best of the captured still images whilst in Iceland, upload them to a server and allow selected users such as user B to view them using his media device 130. The images could be displayed to the user B as a number of thumbnails from which user B can chose to display full size images, to display a slideshow, to generate a montage or a "collage" of images. User A may wish to enhance such a collection of content with a music soundtrack. It may be particularly apt to select automatically a subset of the music that User A enjoyed whilst on holiday as a soundtrack for the slideshow. In order to achieve this, the cloud network comprises a media generation manager 116. The media generation manager 116 is able to access the captured images and associated metadata uploaded from the camera 124 at the user content manager 114, and is also able to access the audio content and audio log at the audio content manager 112. In order to identify audio content items which user A listened to on holiday, the media generation manager 116 correlates, with respect to time, the audio log associated with user A with the metadata of the images uploaded by user A. One or more audio content items (or a portion thereof) which the user A listened to at or around the time of capture of the image content items can therefore be identified and used to accompany the presentation of the image content items to the user B. Referring to FIG. 1A, the user B is able to send a request to the cloud network 110 from the media device 130 for a particular media output, and the media generation manager 116 is able to respond to that request using the above process and provide the media device 130 with media comprising, for example, a sequence of the captured image content items accompanied by an audio soundtrack based on audio content items listened to by the user A at or around the time when the image content items were captured.

Figure 1B:
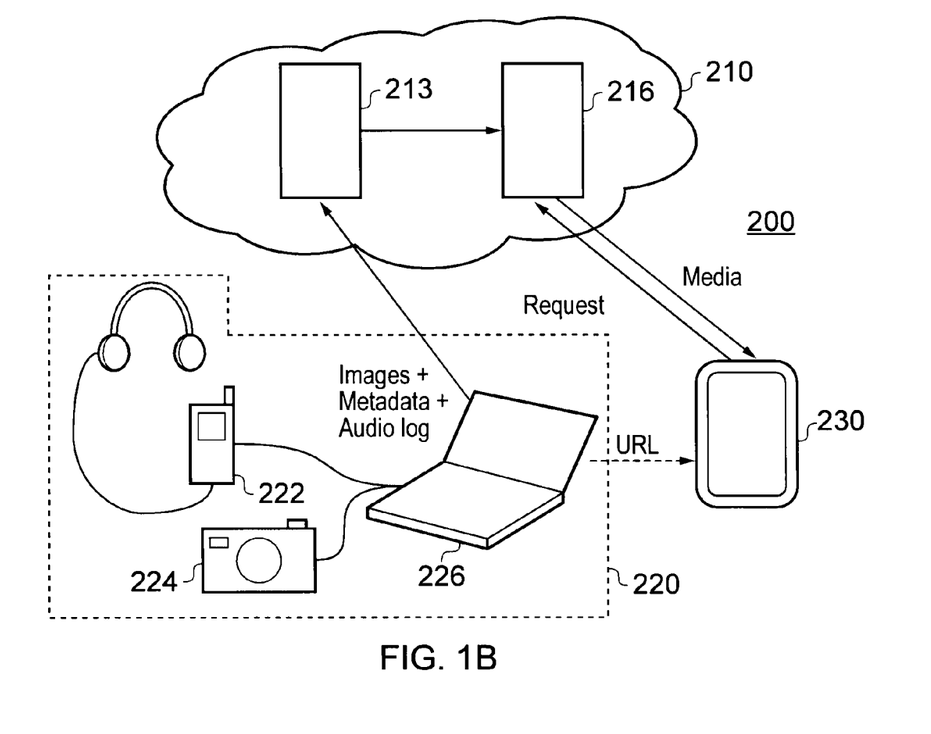

Referring now to FIG. 1B, a system 200 which is similar to the system 100 shown in FIG. 1A is schematically illustrated. In FIG. 1B, the system 200 comprises a cloud network 210, user A equipment 220 and a user B device 230. However, in this case the user A equipment 220 includes an audio device 222 which is not able to, or is not configured to, receive streamed content. The audio device 222 may for example be an MP3 player with headphones. It will be appreciated that the audio device 222 could still be a mobile telephone, but set up to play back locally stored content rather than streamed content. The audio device 222 plays audio content items which are stored at the audio device 222 itself. During playback, the audio device 222 maintains an audio log for user A indicating the audio content items which have been played at the audio device 222. The audio log will identify the played audio content item as well as a time and date when it was played to user A. Optionally, additional information about the played audio data may be stored in the audio log. The user A equipment 220 also includes a camera 224, which may have both still image and moving image (video) capture capabilities, but in contrast to the camera 124 of FIG. 1A, the camera of FIG. 1B is not capable of communicating directly with the cloud network. Instead, in the system 200 of FIG. 1B, both the audio device 222 and the camera 224 are connected first to a computer 226 where the audio log maintained at the audio device 222, and also the captured images and associated metadata from the camera 224 are obtained from the audio device 222 and the camera 224 respectively, and then uploaded to a user content manager 213 at the cloud network 200. Using the same example of operation as for FIG. 1A, the user A travels to Iceland for a holiday with the camera 224 and the audio device 222. User A shoots a number of content items (still images or moving images) whilst on holiday. User A also enjoys listening to music whilst on holiday using the locally stored music provided by the audio device 222. Statistics on the music playback, in the form of an audio log, are generated by and stored at the audio device 222.

Upon return from holiday, user A may wish to generate or share experiences with a user B. User B in the present example is in possession of a media device 230. The user A may upload the captured still images to a server via the PC 226 and allow selected users such as user B to view them using his media device 230. In the case of FIG. 1B, the user B is provided with access to the media by way of an Internet link sent from the user A to the user B in the form of an email for example. Alternatively, the media could be downloaded to the PC 226, stored on a DVD or similar media, and physically provided to the user B. In order to generate the media, the cloud network 210 comprises a media generation manager 216. The media generation manager 216 is able to access the captured images and associated metadata uploaded from the camera 124 at the user content manager 213, and is also able to access the audio content and audio log again at the user content manager 213. In order to identify audio content items which user A listened to on holiday, the media generation manager 116 correlates, with respect to time, the audio log associated with user A with the metadata of the images uploaded by user A. One or more audio content items (or a portion thereof) which the user A listened to at or around the time of capture of the image content items can therefore be identified and used to accompany the presentation of the image content items to the user B.

Figure 2:
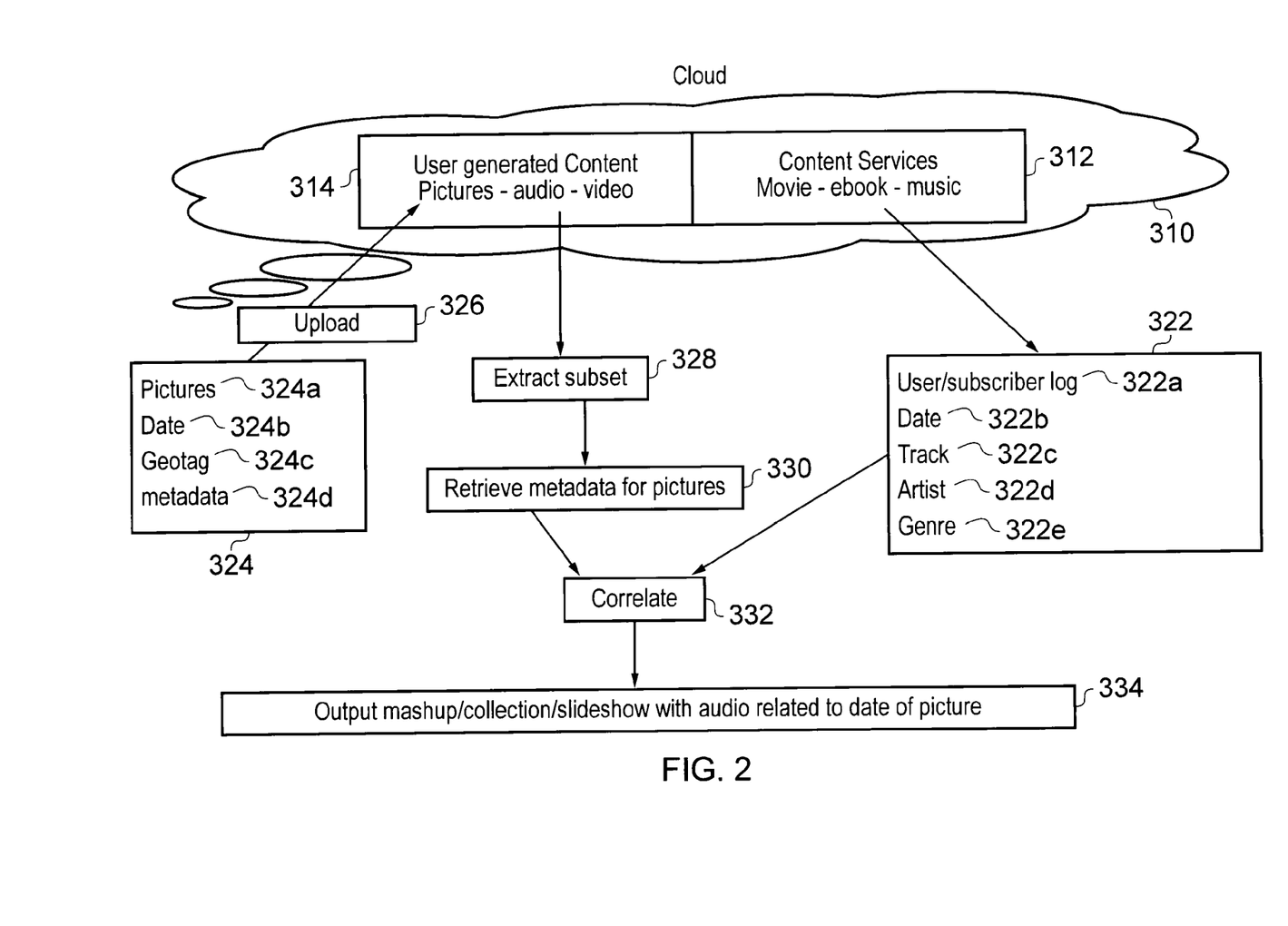
FIG. 2 schematically illustrates a process of managing and correlating user generated image content and commercial audio content.

Referring now to FIG. 2, an example of a process of selecting an audio soundtrack to accompany user generated still or moving images is schematically illustrated. A cloud network 310 is shown at the top of FIG. 2, and provides content services (for example uploaded movies, ebooks and music) at a part 312. At a part 314 of the cloud network, user generated content (for example pictures, audio and video) is managed. It will be appreciated that the function of the part 312 corresponds broadly with the audio content managers 112 and 212 shown in FIGS. 1A and 1B, and that the function of the part 314 corresponds broadly with the user content managers 114 and 214 shown in FIGS. 1A and 1B. As can be seen from the left hand side of FIG. 2, image capture data 324 is generated and includes in the present example the pictures (images) 324a, a date of capture 324b, a geotag 324c which indicates a geographical location at which the image was captured, and other metadata 324d. It will be appreciated that the geotag 324c might be a GPS position, an approximate position determined from a Cell ID of a mobile telecommunications network, a WiFi location derived from a WiFi connection, or a user-entered geographical location (country, city, address or tourist attraction). The image capture data 324 is uploaded 326 to the user generated content management part 314 of the cloud network 310 and stored at the cloud network. The user generated content may be specifically associated with a particular user by way of a unique identifier or user name. Meanwhile, audio statistics in the form of an audio log 322 are maintained at the content services part 312 of the cloud network 310. In particular, the audio log 322 specifies a user/subscriber log 322a which lists by date 322b the tracks 322c, artists 322d and genre 322e listened to by the user 322a. Again, a particular subscriber log is specially associated with a particular user, for example by way of a unique identifier or user name.

When media is to be generated from the captured images, a subset of the captured images is extracted 328, either by the user which has provided the images, or by another user who wishes to view the images. The selection might be by way of clicking on thumbnails of a desired image, or by filtering on the basis of date/time or location using the date 324b or geotag 324c for example. Filtering on the basis of location may be a suitable way of narrowing down the desired images to those relating to a particular city or tourist destination for example. Filtering on the basis of date/time may be suitable for limiting the images to those relating to a particular time-bounded event.

When the desired images have been selected, metadata—for example the date 324b, geotag 324c and other metadata 324d—relating to those images is retrieved 330. Then, the metadata, principally but not exclusively the date/time 324b, is correlated 332 with the user/subscriber log 322 corresponding to the user 322a. This is possible because 4 the identity of the user can be known to both parts of the cloud network by way of the same or corresponding unique identifiers or user names. The pictures 324a may in this way be correlated with particular tracks, artists and/or genres listened to by the user based on the date/time 324b specified in the metadata 324 and the date/time 322b specified in the audio log 322.

In one embodiment, the tracks correlated with the selected pictures may be used to generate and output 334 a mashup/collection/slideshow with audio related to the date of the picture. The audio related to the date of the picture might be the specific tracks listened to by the user at the date of capture of the images, or might be tracks which share an artist or genre (for example) with the tracks listened to by the user at or around the date of capture of the images. The output may be in the form of a link which displays a slideshow and concurrently retrieves the music from the cloud. Alternatively, the output may be a fixed movie file of the slideshow with music.

In FIG. 2, image handling and audio handling in relation to a user is conducted at the same cloud network. However, it will be appreciated that these functions may be handled by separate networks. For example, the audio handling may be carried out by a dedicated audio streaming provider, with the audio statistics generated by the audio streaming provider in relation to audio usage by a given user being uploaded to a cloud network which is handling images being uploaded by that given user. This process could either be direct (audio statistics provided under agreement from the audio streaming provider to the cloud network), or indirect (audio statistics provided to the user, and then uploaded to the cloud network in association with the image content items).

Figure 3:
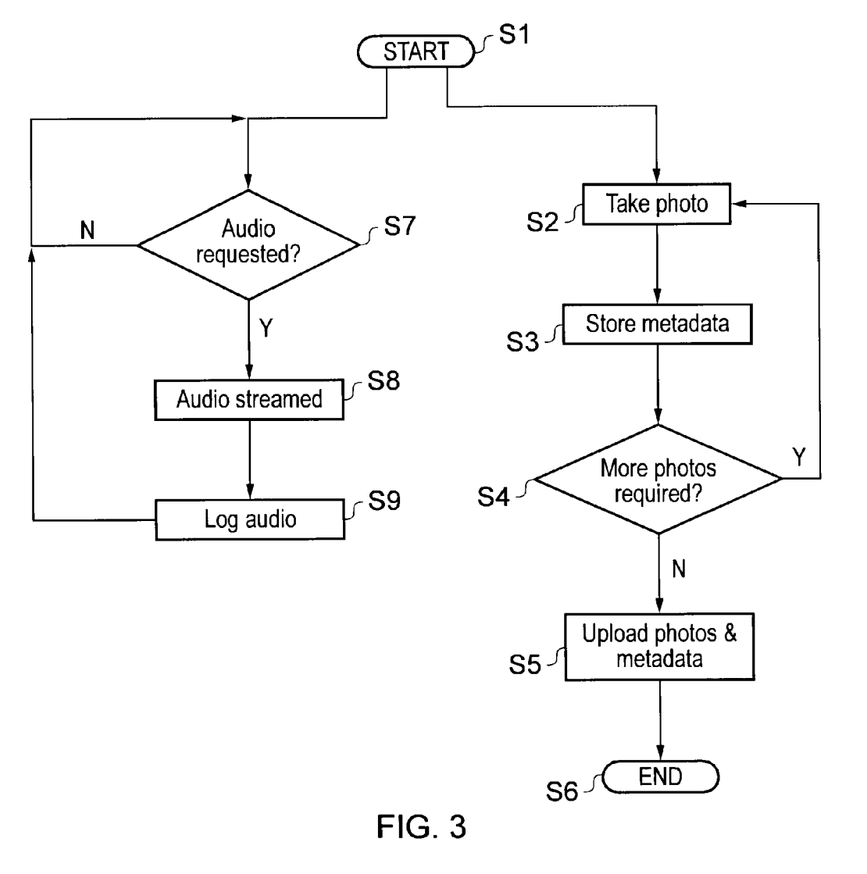
FIG. 3 is a schematic flow diagram of an image capture and upload procedure and an audio streaming and logging procedure.

FIG. 3 is a schematic flow diagram which illustrates an example process of image capture, upload and audio logging. The process commences at a step S1, and moves on in parallel down two threads. The first thread follows steps S2, S3, S4, S5 and S6 and relates to the capture of images at a capture device associated with the user, and a subsequent upload of the captured images to a network. The second thread follows step S7, S8 and S9 and relates to the streaming of audio to an audio device associated with the user, and logging of the streamed audio content. Following the first thread, at a step S2 the user takes a photo using the image capture device. The photo is stored locally at the image capture device at this stage. In addition, metadata relating to the captured photo, and including as a minimum a time of image capture, is locally stored at a step S3. At a step S4, if the user wishes to take more photos prior to upload, then the process returns to the step S2. If on the other hand the user has finished taking photos, the process moves on to a step S5, where the captured photos and the associated metadata are uploaded to the network. The process then ends at a step S6.

In parallel with the above, the user may request audio playback via a streaming channel from the network at a step S7. If such a playback of an audio item is requested, then the process moves on to a step S8 where the requested audio content item is streamed from the network to the audio device. Note that the request may be for a particular content item, a particular playlist selected manually for a user or by way of a recommendation engine, or may be for a channel corresponding to a particular radio station for example. At a step S9, the streamed audio content item is logged, providing a record of the music listened to by the user during the time of image capture.

Figure 4:
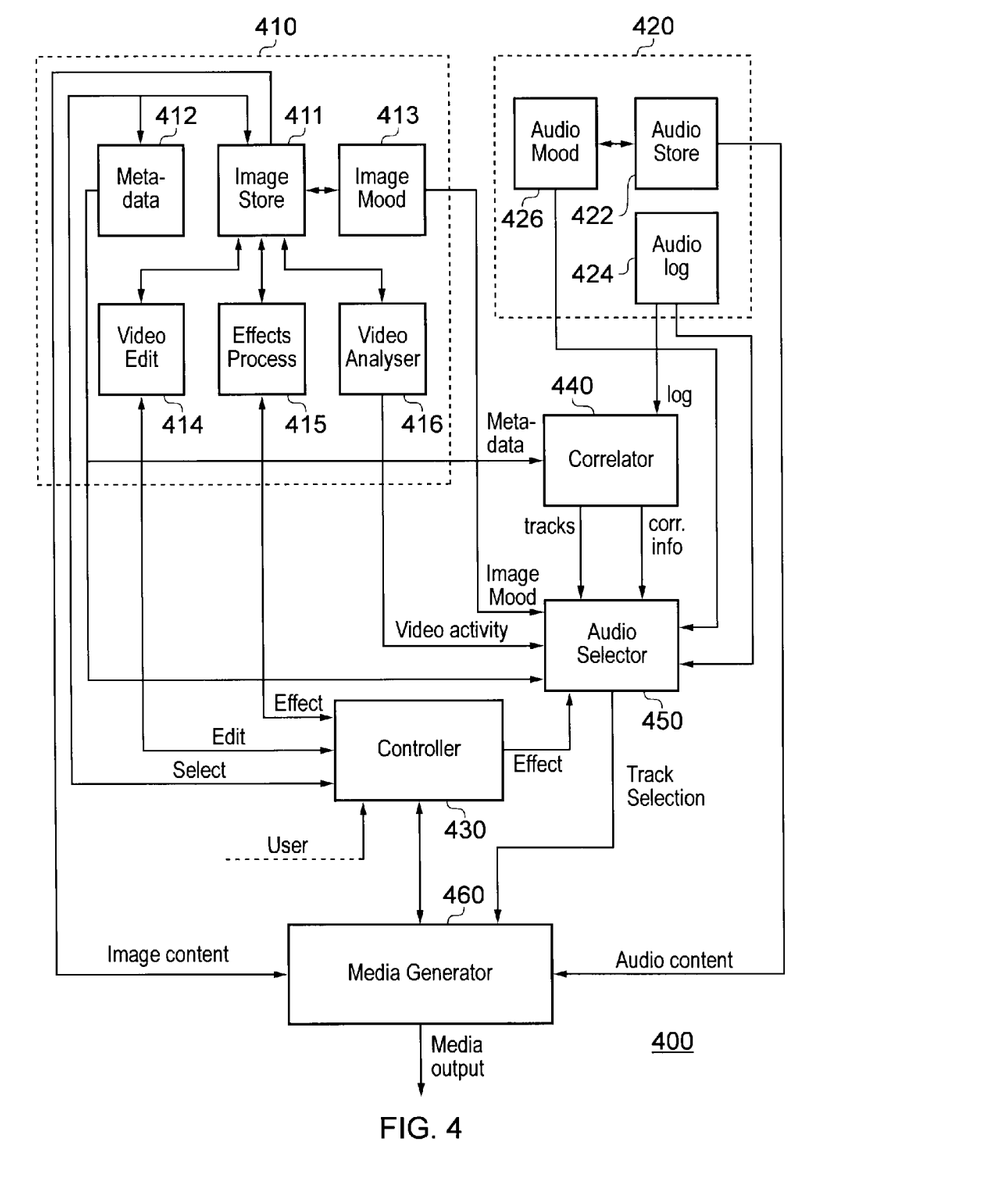
FIG. 4 schematically illustrates example functionality of a cloud network according to one embodiment.

Turning now to FIG. 4, an example arrangement of a cloud network 400 is schematically illustrated. At the cloud network 400 there is provided a user content manager 410, an audio content manager 420, a controller 430, a correlator 440, an audio selector 450 and a media generator 460. The user content manager 410 and the audio content manager 420 broadly correspond to the identically titled elements of FIGS. 1A and 1B. The user content manager 410 comprises an image store 411 which stores the uploaded images captured by users. The user content manager 410 also comprises a metadata store 412 which stores the uploaded metadata relating to the images stored in the image store 411. The user content manager also comprises an image mood analyser 413 which is operable to analyse the picture data (for example image brightness, contrast, edges, colours, textures, layout, shape, saturation, brightness, structure and colour combinations) to determine a "mood" associated with an image. For example, a dark image with subdued colours might be determined to have a "mellow" mood, whereas a bright, colourful image might be determined to have an "upbeat" or "energetic" mood. Some further examples are listed in the following table:

| Mood | Associated image characteristics or scene type |
| --- | --- |
| Energetic | High brightness, high contrast, bright colours, cityscape |
| Relaxed | Low to medium brightness, low contrast, beach or countryside |
| Mellow | Medium brightness, medium contrast, soft edges |
| Upbeat | Bright colours, medium contrast, defined edges |
| Emotional | Subdued colours, soft edges, low contrast, close up faces |
| Lounge | Subdued colours and low brightness |
| Dance | Heavy structure, gaudy colour combinations |
| Extreme | Heavy structure, high contrast |

The user content manager 410 also comprises an online video editor 414 which is operable under the control of a user to edit one or more moving image content items (videos), for example to cut together multiple videos or cut out unwanted content from a video. The edit information specifying cut points may be available for time synchronisation in the media output. Furthermore, audio content items selected to accompany the video image content item may be made available to the online video editor 414 so that the editing process can directly edit the audio track along with the video content item itself.

The user content manager 410 also comprises an effects processor 415 which is operable under the control of a user to apply effects, such as image enhancement (colour correction or image sharpening for example) of artistic effects (sepia, scratches, black and white or watercolour effects for example). It will be appreciated that particular effects may be associated with particular styles of music. For example, soft art effects may be well matched to a relaxed style of music, and sepia or black and white effects may be well matched to a particular era of music, such as the 1930s or 1940s (pre-colour photography era). Usually such effects are applied to still images, but it will appreciated that effects could be similarly applied to video images, subject to data processing constraints.

The user content manager 410 also comprises a video analyser for analysing characteristics of moving image content items (videos), such as an amount of motion present in the image. For example, footage of a sporting event would be likely to include a relatively large amount of motion, while a slow pan of a scenic landscape would be likely to include a relatively small amount of motion.

The audio content manager 420 comprises an audio store 422 in which is stored audio content items. An audio log 424 is also provided which stores audio statistics regarding items of audio content which have been listened to by various users.

The audio content manager 420 also comprises an audio mood analyser 426 which is operable to analyse the waveforms of audio data to determine a mood evoked by an audio content item. Audio characteristics such as volume, tempo, tone, melody, rhythm, instruments and vocals can be taken into account in such an analysis. For example, an audio content item having a fast tempo might be categorised as "dance" or "energetic", an audio content item having a high volume, heavy drums and screaming vocals might be categorised as "extreme". The following table provides some examples of audio characteristics which might represent a particular mood category.

| Mood | Associated audio characteristics |
| --- | --- |
| Energetic | High tempo, upbeat rhythm |
| Relaxed | Slow tempo, low volume, steady rhythm |
| Mellow | Slow tempo, low volume, subdued tone |
| Upbeat | Medium to fast tempo and rhythm |
| Emotional | Low to medium tempo, powerful vocals or instrumentation |
| Lounge | Low to medium tempo, smooth instrumentation and vocals |
| Dance | Fast tempo |
| Extreme | Fast tempo, loud, harsh sounds |

A correlator 440 is provided which serves to correlate selected images in the image store 411 with audio content items in the audio store which were listened by the user at or around the time of capture of the selected images, and/or with audio statistics relating to the type of music (genre or artist for example) listened to by the user at or around the time of capture of the selected images. This correlation is conducted on the basis of the capture time information stored at the metadata store 412 and the playback time information stored at the audio log 424. In this way, audio content items which were listened to by a user at or around the time the selected image content items were captured can be identified.

For example, in some embodiments the correlation may operate by identifying a date/time range of the capture of the selected image content items. This may define a period of one week, for example 1 May to 8 May of a given year. This period is then compared to the audio playback log to identify audio played back within that period. This may for example identify five audio content items with identifiers #1, #2, #3, #4, #5, with items #3 having been played 4 times and item #2 having been played 3 times. All other items were played once. The correlation may in this way identify candidate audio content items as those listened to during the defined period, and may also serve to identify a number of times of playback of those candidate items during the defined period so that the accompanying audio required to fill a time period for a slideshow can be selected to prioritise items #3 and #2 as implicitly those ones of the audio items most enjoyed by a user.

In other embodiments, there might not be enough audio items played back in the time/date range to fill the intended time period for a slide show. In such a case, the time/date range for audio items could be iteratively increased beyond the time/date capture date of the image items to identify a greater variety of audio content accompaniment. For example, a target minimum number of audio items could be set based on the number of (and in the case of video images, the length of) the image content items. If the target minimum number of audio content items is not reached when performing the correlation based on the standard range, the range could then be increased, as described above.

In some embodiments users may be able to give like or dislike (possibly on a graded scale of like/dislike) feedback to audio content items. This may also be captured in the playback log and used to calculate preferred tracks for the audio accompaniment.

An audio selector 450 is provided which receives from the correlator 440 either a list of audio content items correlated with the selected images or information on the type of music correlated with the selected images. The audio selector 450 also receives from the correlator 440 correlation information indicating a specific correlation between particular ones or groups of the selected images and particular audio content items or types of music. Along with the correlation information might also be provided a number of times which each track was listened to during the relevant time period, as described above. In addition to these inputs, the audio selector 450 also receives audio mood data relating to the list of audio content from the audio mood engine 426, image mood data relating to the selected images from the image mood engine 413, a level of video activity relating to any moving image content items of the selected image content items from the video analyser 416, audio statistics from the audio log 424, image metadata from the metadata store 412, and effect information indicating any image processing effects which have been applied to one or more of the image content items at the effects processor 415.

On the basis of these various parameters, the audio selector 450 makes a judgement as to the most appropriate audio content to accompany the selected image content items. For example, where the correlator 440 has provided a list of the audio content items listened to by the user at or around the time of capture of the selected images (for example during a period corresponding to the user's holiday), then the audio selector 450 may select a subset of the list of audio content items (or portions thereof) which are most suitable to accompany the selected images. In this case, the audio soundtrack which accompanies the sequence of selected images will directly correspond to the music listened to by the user during the period when the selected images were captured. On the other hand, where the correlator 440 has provided an indication of the type of music (for example artists, or other categorisation) listened to by the user at or around the time of capture of the selected images, then the audio selector 450 may select different audio items from those listened to by the user, but will select the audio items to be consistent with the type of music listened to by the user. This would give greater flexibility to the selection of audio content items which are more suited to the characteristics of the selected images. However, in some cases it may be considered undesirable to deviate from the use of audio content items which were actually listened to by the user.

As an example of the selection process, the audio selector 450 might select audio content items to accompany a video image based on the amount of motion in the video. Techniques for determining an amount of motion in video images are well known in the art, and may utilise the presence and magnitude of motion vectors in an MPEG video sequence for example. For video items with a large amount of motion, energetic, dance or extreme music categories could be selected. For images where a particular effect has been applied, a music content item or category of music content item having some association with that effect could be selected. For example, a special effect which softens the image features might result in the selection of mellow audio content item, or a black and white or sepia effect might result in the selection of era appropriate music as described above. The time of day of image capture may also be taken into account, with images captured at a particular time of day resulting in the selection of a particular time of day category of audio item. The selection may also be done by way of mood correlation. It is clear from the above tables that both image content and audio content can be categorised by mood based on various parameters. Using this, the audio selector may preferentially select audio content items which are closely mood-correlated with the selected image content items. For example, a series of image content items which have a mood category of "upbeat" are likely to be accompanied by one or more audio content items (or portions thereof) which are also categorised as "upbeat". It is much less likely that an image content item categorised as "upbeat" will be accompanied by an audio content item which has been categorised as "relaxed".

The degree of time correlation between particular image content items and audio content items may also be taken into account, such that an image which was captured at a particular time could be accompanied by an audio content item which was actually being played at the time the image was captured.

An example process for selecting audio content items from the list provided by the correlator 440 using some of the above parameters could be as follows:

(1) Separate images into still images and moving (video images);
(2) For moving images, set a target number of audio items based on the length of the moving image, and select at least that number of audio content items from the list which have a tempo or mood category which best matches an amount of motion in the video—for example based on whether the magnitude of motion vectors in an MPEG based video sequence exceeds a predetermined threshold value;
(3) For still images, group the still images in the list by mood as indicated by the image mood data associated with the images;
(4) For each group of still images, set a target number of audio items based on the number of still images, and select at least that number of audio content items from the list having a mood category matching (or similar to) that of the group of still images;
(5) Where some of the images in a group are subject to a special effect, optionally refine the selection to audio content items having a relationship with that effect;
(6) If the selection of audio content items is still greater than the target number, refine the selection to audio content items listened to at or near a time of capture of one or more of the images in the group;
(7) If the selection of audio content items is still greater than the target number, refine the selection to audio content items listened to more than once during the holiday period; and
(8) If the selection of audio content items is still greater than the target number, refine the selection to audio content items indicated by the user as preferred.

In the above manner, a gradual reduction of the list of audio content items selected by the correlator 440 can be achieved, resulting in a reduced set of audio content items which are particularly appropriate to accompany the selected images. It will be appreciated that many other implementations could be envisaged, for example by generating mood-representing functions for the image content items and the audio content items, and comparing the respective image and audio mood functions using mathematical correlation.

Once the audio selector 450 has selected appropriate audio content items or portions thereof to accompany the selected image content items, an indication of the selection is provided to a media generator 460. The media generator 460 is able to obtain the selected image content items from the image store 411, to obtain the audio content items indicated by the audio selector 450 from the audio store 422, and to generate a media output from the selected image content items and audio content items, optionally based on further input from the controller 430. For example, the user may wish to influence the media generation process, for example by overriding the automated audio selection for particular songs, by changing the volume settings, or by changing the timing of transitions between content items in the sequence. The controller 430 may also provide information relating to cut points in any video content items, in which case the media generator 460 may be operable to synchronise audio transitions or audio features with cut points in the video images within the sequence.

In an alternative embodiment, the media generator 460 may operate directly using the audio content items correlated with the selected image content items, without any pre-selection taking place at an audio selector.

Figure 5A:
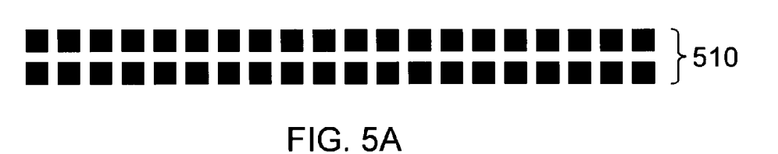
FIGS. 5A-5E schematically illustrate an image and audio selection process and related metadata and audio log entries.
Figure 5B:
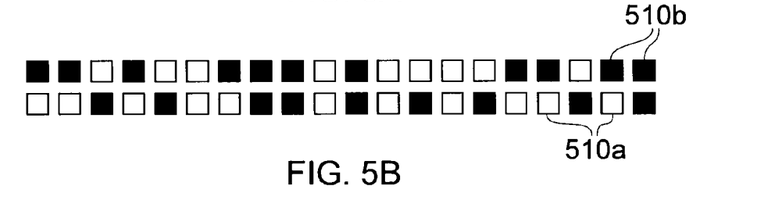
Figure 5C:
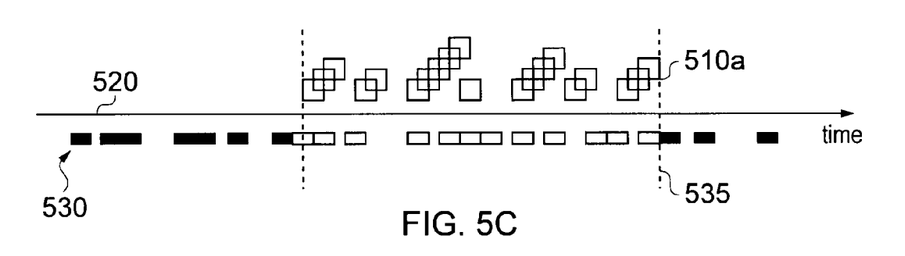

Referring now to FIGS. 5A to 5E, an example process of image selection, image/audio correlation and metadata extraction is schematically illustrated. Referring first to FIG. 5A, a set of twenty image content items 510 currently stored in the image store 411 are shown. In FIG. 5B, a subset of ten of these are shown to be selected 510a in FIG. 5B (the selected image content items 510a are shown as white blocks, to contrast with the unselected content items 510b which are shown as black blocks). The selected image content items 510a are those which a user wishes to form the basis of a media output with accompanying audio. Typically this user will be the user who uploaded the image content items, but alternatively it may be the user who wishes to view a media output based on those image content items, or indeed any other user with suitable access rights to the stored image content items. In FIG. 5C the selected image content items 510a are shown against a timeline 520. As can be seen from FIG. 5C the selected image content items 510a fall within a group on the timeline 520, potentially representing a particular event (for example a holiday) during which the images were captured. Also shown against the timeline 520 is a set of entries 530 from the audio log 424. In FIG. 5C, a subset 535 of the entries are deemed to be time-correlated with the selected image content items 510a.

Figure 5D:
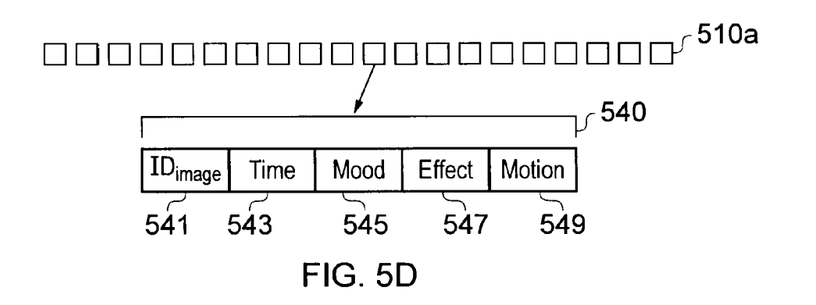

Referring to FIG. 5D, the selected image content items 510a are shown, along with an example metadata entry 540 corresponding to one of the selected image content items. It will be appreciated that each of the selected image content items 510a will have a respective metadata entry. In FIG. 5D, the metadata 540 includes an image ID 541 identifying which of the selected images the metadata entry relates to, a time of capture 543 of the selected image, a mood 545 associated with the selected image, an effect 547 applied to the selected image (if applicable), and an amount of motion 549 in the selected image (video content only).

Figure 5E:
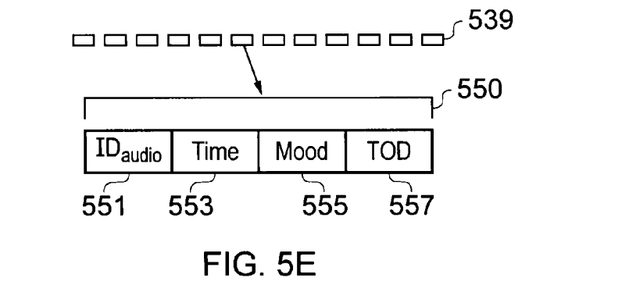

Referring to FIG. 5E, the audio content items 535 considered to be time-correlated with the selected image content items are shown, along with an example audio log entry 550 corresponding to one of the audio content items 535. It will be appreciated that each of the audio content items 535 will have a respective audio log entry. In FIG. 5E, the audio log entry 550 includes an image ID 551, a time of playback 553, a mood 555 associated with the audio content item and a time of day indicator 557 identifying a time of day (for example morning, daytime, evening, night or midnight) associated with the track.

It will be appreciated that the time metadata 543 of FIG. 5D can be compared with the time of day categorisation 557 in the audio log entry of FIG. 5E to determine whether an audio content item is appropriate to accompany a particular image content item. It will be further appreciated that the mood metadata 545 of FIG. 5D can be compared with the mood categorisation 555 in the audio log entry of FIG. 5E to determine whether an audio content item is appropriate to accompany a particular image content item. More generally, the audio selector 450 described above with reference to FIG. 4 is able to use the image metadata and audio log entries illustrated in FIGS. 5D and 5E to select audio tracks most strongly correlated with the selected image content items with respect to mood, time or time of day. It will also be appreciated that the effect metadata 547 and the motion metadata 549 can be used to select audio content items which reflect a particular image processing effect or amount of video motion respectively.

Figure 6:
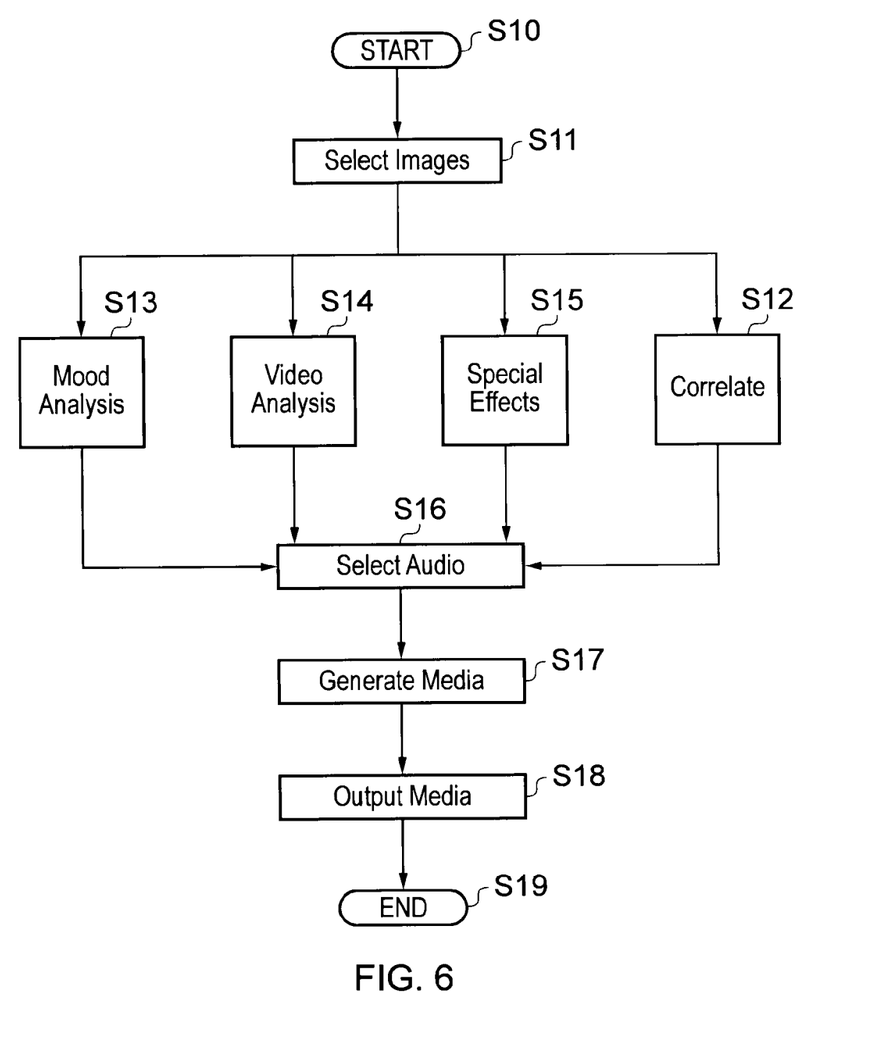
FIG. 6 is a schematic flow diagram of an image selection and processing, audio selection and media generation process according to one embodiment.

FIG. 6 is a schematic flow diagram which illustrates an example process of media generation and output. The process commences at a step S10. At a step S11, a user selects images which he desires to form a media output. Then, several processes may be conducted in parallel at steps S12, S13, S14, S15 and S16. In particular, at a step S12, the selected images are correlated with a portion of the audio log for the user of the capture device to identify audio content which the user of the capture device listened to over a period during which capture of the selected image content items took place. At a step S13, mood analysis is conducted on some or all of the selected images to categorise those images in the manner described above with reference to FIG. 4. The mood analysis may be conducted either on only the still images, or on both still images and video images. At a step S14, any video images out of the selected images are subject to video analysis to determine an amount of motion. This may be carried out by looking for large magnitude pixel changes between frames, or by determining the magnitude of motion vectors in an MPEG video stream for example. At a step S15, the user may apply special effects to an image, such as sepia, black and white or artistic effects.

At a step S16, audio content items to accompany the selected image content items are automatically selected based on the correlation between the selected image content items and the audio log of the user conducted at the step S12, and based on various parameters relating to the mood analysis, video analysis and applied effects conducted at the steps S13, S14 and S15. Image metadata parameters (such as geographical location) and audio log parameters (such as genre or artist) may also be used in the selection process.

At a step S17, the selected image content items and the selected audio content items are used to generate a media file or stream which is then output at a step S18. It will be appreciated that the image and audio components could be combined together to form a single file or data stream, or could be generated as separate files or data streams which can be played back in parallel. The process then ends at a step S19.

Figure 7:
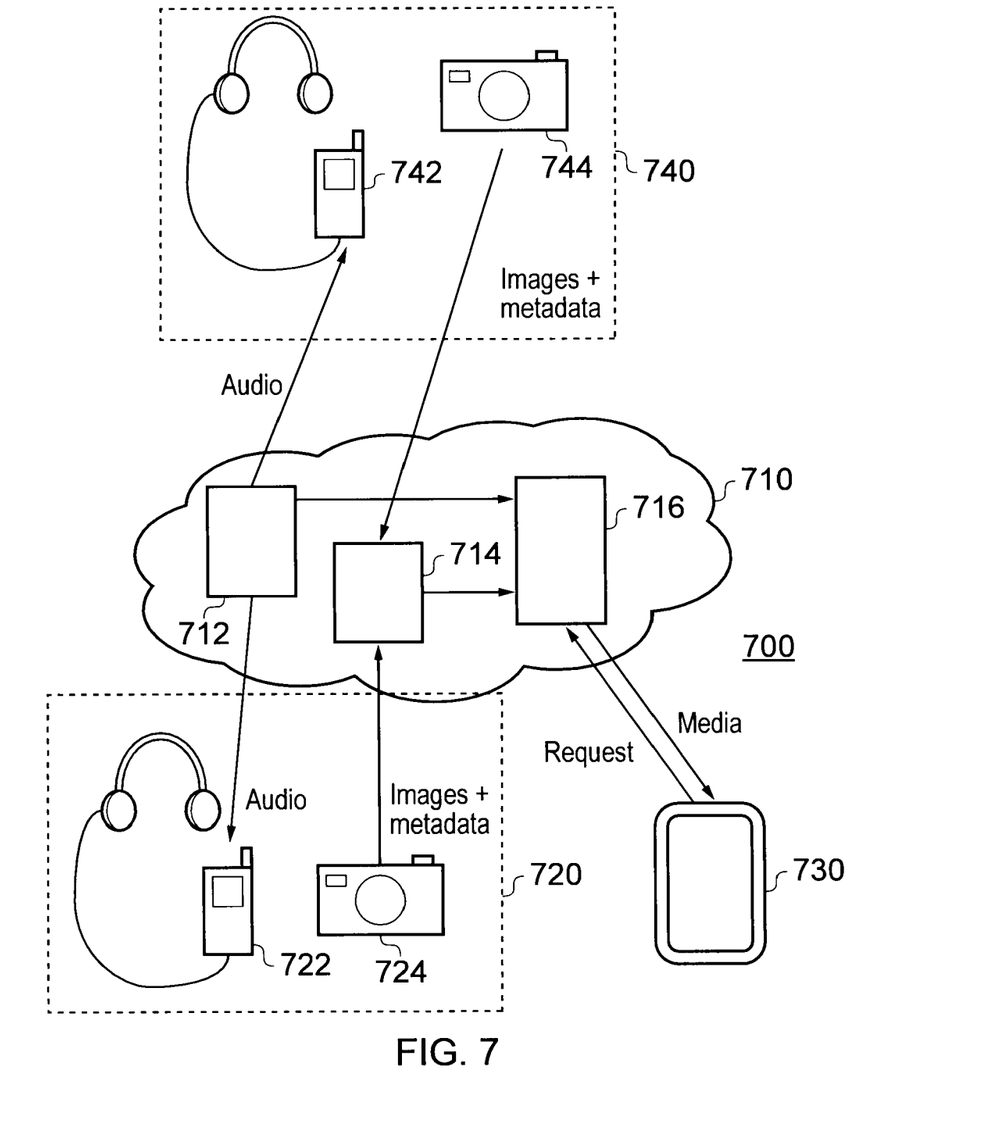
FIG. 7 schematically illustrates a variant of FIG. 1A in which a media output is a mashup of user generated content and commercial audio relating to a plurality of users.

It will be appreciated that several users may independently capture images related to a single event, such as a shared holiday. In this case, it is desirable to be able to generate a media output which combines images and audio related to all of the users. This is schematically illustrated in FIG. 7. In FIG. 7 a system 700 is shown comprising a cloud network 710, user A equipment 720, a user B device 730 and user C equipment 740. The user A equipment 720 includes a mobile telephone 722 having an audio playback function and headphones. The mobile phone receives streaming audio from an audio content manager 712 in the cloud network 710. The audio content manager 712 maintains an audio log for user A indicating the audio content items which have been streamed to the audio playback device 722 and are thus presumed to have been listened to by user A. The user A equipment 720 also includes a camera 724, which may have both still image and moving image (video) capture capabilities. The user A is able to capture images on the camera 724, for example while on holiday, and to upload the captured images to a user content manager 714 in the cloud network 710. As well as uploading the images, the user A will upload metadata relating to the images to the user content manager 714. Similarly, the user C equipment 740 includes a mobile telephone 742 having an audio playback function and headphones which receives streaming audio from the audio content manager 712 in the cloud network 710. The audio content manager 712 maintains an audio log for user C indicating the audio content items which have been streamed to the audio playback device 742 and are thus presumed to have been listened to by user C. The user C equipment 740 also includes a camera 744, which may have both still image and moving image (video) capture capabilities. As for the user A, the user C is able to capture images on the camera 744 and to upload the captured images to the user content manager 714 in the cloud network 710. As well as uploading the images, the user C will upload metadata relating to the images to the user content manager 714.

In an example operation of the above system, both users A and C travel to Iceland for a holiday with their respective cameras 724, 744 and their respective mobile telephones 722, 742. Both users A and C shoot a number of content items (still images or moving images) whilst on holiday in Iceland. Users A and C also enjoy listening to music whilst on holiday using the network delivered music system provided by the mobile telephones 722, 742 and the audio content manager 722. Statistics on the music playback, in the form of an audio log, are stored by the audio content manager 722 separately against both users. This may be against particular songs, artists or genres for example.

Upon return from holiday, both users A and C may wish to generate or share experiences with other users, in the present case a user B. User B in the present example is in possession of a media device 730, in this case a tablet PC. Users A and C may select the best of the still and moving images captured by both users whilst in Iceland, upload them to a server and allow selected users such as user B to view them using his media device 730. When setting a music soundtrack to accompany the selected images, it may be desirable to select automatically a subset of the music that one or other (or both) users A and C enjoyed whilst on holiday as a soundtrack for the slideshow. In order to achieve this, the cloud network comprises a media generation manager 716. The media generation manager 716 is able to access the captured images and associated metadata uploaded from the cameras 724, 744 at the user content manager 714, and is also able to access the audio content and audio log at the audio content manager 712. In order to identify audio content items which users A and C listened to on holiday, the media generation manager 716 correlates, with respect to time, the audio logs associated with each of users A and C with the metadata of the images uploaded by users A and C. One or more audio content items (or a portion thereof) which the users A and C listened to at or around the time of capture of the image content items can therefore be identified and use to accompany the presentation of the image content items to the user B. Referring to FIG. 7, the user B is able to send a request to the cloud network 710 from the media device 730 for a particular media, and the media generation manage 716 is able to respond to that request using the above process and provide the media device 730 with media comprising, for example, a sequence of the captured image content items accompanied by an audio soundtrack based on audio content items listened to by the users A and C at or around the time when the image content items were captured. In this case it may be beneficial to bias the selection of audio items for the soundtrack towards any audio items listened to by both users A and C, because these are likely to have a greater shared significance in relation to the holiday and thus the captured images.

It will be appreciated that, in the above embodiments, the music services provided to the users may be funded by advertising. In the case of the audio accompaniment to the image content items of the media output, a short advertisement might be presented at the beginning of a slideshow of the selected images, or may be overlaid for all or some of the slideshow. In addition, the recipient of the media output may be able to buy the audio tracks which accompany the slideshow, for example by interacting with the media output to indicate a desire to purchase the audio track. The music services may instead be funded directly by the user, who pays (for example) a monthly subscription to receive the service with no adverts. It will be appreciated that some of these payments will be passed on to a royalty collection agency, such as a PRS (Performing Rights Society). In this case, a database may be utilised to record audio usage to enable an appropriate level of royalty payment to be made.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating media content, comprising:
receiving, at a network, still or moving image content items captured by a capture device, and image content metadata indicating a time of capture of each of the image content items;
storing a playback log indicating playback times of audio content items provided to a user of the capture device prior to the receiving;
correlating one or more of the captured image content items with one or more portions of the playback log based on the time of capture indicated by the metadata relating to the one or more captured content items and the playback times indicated by the playback log; and
generating a media output as a collection of a plurality of the captured image content items stored at the network accompanied by audio content related to the one or more portions of the playback log which are correlated with the captured image content items in the collection.

2. A method according to claim 1, comprising:
selecting the audio content to accompany the captured image content items of the collection in dependence on a category of audio item indicated in the one or more portions of the playback log correlated with the captured image content items in the collection.

3. A method according to claim 1, comprising:
selecting the audio content to accompany the captured image content items of the collection from the audio content items provided to the user over one or more periods of time during which the image content items were captured based on the correlation between the image content metadata and the playback log.

4. A method according to claim 1, comprising:
providing the media output to a playback device of a different user for playback.

5. A method according to claim 4, comprising:
obtaining said media at said playback device via an internet link operable to set up an Internet connection between the playback device and the network.

6. A method according to claim 1, comprising:
selecting a plurality of the uploaded captured content items for inclusion in the collection of image content items; wherein
said selected content items are correlated with one or more portions of the playback log corresponding to the time of capture indicated by the metadata relating to the one or more selected content items; and said media is generated as a collection of the selected image content items stored at the network accompanied by audio content related to the one or more portions of the playback log which is correlated with the selected image content items in the collection.

7. A method according to claim 6, wherein said selecting is conducted by specifying one or more of a subject tag, a geographical location, a time window and a still/moving image type as selection constraints, and by comparing the selection constraints with the image content metadata to identify image content items for selection.

8. A method according to claim 1, wherein the collection of selected image content items is a sequence of the selected image content items.

9. A method according to claim 1, comprising:
analysing the picture data of uploaded image content items and categorising the image content items based on the analysis; and
preferentially selecting audio content items provided to the user which have a category which matches the categorisation of the image content items in the collection to accompany the collection of image content items.

10. A method according to claim 9, comprising:
analysing audio characteristics of audio content items and categorising the audio content items based on the analysis to form said category of the audio content items.

11. A method according to claim 1, comprising:
analysing the metadata relating to uploaded image content items and categorising the image content items based on the analysis; and
preferentially selecting audio content items provided to the user which have a category which matches the categorisation of the image content items in the collection to accompany the collection of image content items.

12. A method according to claim 1, comprising:
selecting audio content items to accompany the collection of image content items in dependence on a time of day at which the image content items were captured.

13. A method according to claim 12, comprising:
categorising the image content items by time of day based on the time of capture of the image content items indicated by said image metadata; and
preferentially selecting audio content items which have a time categorisation which matches the time categorisation of the image content items in the collection to accompany the collection of image content items.

14. A method according to claim 1, comprising:
selecting audio content items to accompany the collection of image content items in dependence on metadata associated with the image content items.

15. A method according to claim 1, comprising:
streaming audio content from the network to the user; and
generating the playback log at the network in dependence on the audio content streamed to the user.

16. A method according to claim 1, comprising:
playing audio content to the user at a playback device;
generating the playback log at the playback device in dependence on the audio content played on the playback device; and
receiving, at the network, the playback log.

17. A method according to claim 1, comprising:
applying an image processing effect to one or more of the image content items; and
selecting an audio content item to accompany the collection of image content items in dependence on a type of image processing effect applied to the image content item.

18. A method according to claim 1, wherein:
the image content items comprise a moving image content item; and
the method comprises:
detecting an amount of motion in the moving image content item; and
selecting one or more audio content items to accompany the moving image content item in the media in dependence on an amount of motion detected in the moving image content items.

19. A method according to claim 1, wherein:
the image content items comprise one or more moving image content items; and
the method comprises:
editing the one or more moving image content items; and
aligning a transition between two subsequent audio content items at or near a cut point in the edited moving image content items.

20. A method according to claim 1, comprising:
receiving, at the network, still or moving image content items captured at one or more other capture devices and image content metadata indicating a time of capture of each of the image content items;
storing a playback log indicating playback times of audio content items provided to users of each of the one or more other capture devices;
correlating one or more of the image content items captured by the capture device and the one or more other capture devices with one or more portions of the playback logs associated with the users of the capture device and the one or more other capture devices based on the time of capture indicated by the metadata relating to the content items captured by the users of the capture device and the one or more other capture devices and the playback times indicated by the playback log; and
generating the media as a collection of a plurality of the image content items captured by the capture device and the one or more other capture devices accompanied by audio content related to the portions of the playback logs which are correlated with the captured image content items in the collection.

21. A media content generation system, comprising:
a network;
a capture device configured to capture still or moving image content items and upload the captured image content items and image content metadata indicating a time of capture of each of the image content items to a network; and
an audio device configured to play audio content items received from the network prior to the capture device uploading the captured image content items to the network;
the network comprising:
a playback manager which stores a playback log indicating playback times of audio content items played by the audio device;
a correlation engine for correlating one or more of the captured image content items with one or more portions of the playback log based on the time of capture indicated by the metadata relating to the one or more captured content items and the playback times indicated by the playback log; and
a media generation engine for generating media as a collection of a plurality of the captured image content items stored at the network accompanied by audio content related to the portion of the playback log which is correlated with the captured image content items in the collection.

22. A media content generation system according to claim 21, wherein both the capture device and the audio device are associated with the same user.

23. A server side apparatus, comprising a processor configured to:
- interface with an image repository to obtain selected still or moving image content items captured by a capture device and uploaded to the image repository, and image content metadata indicating a time of capture of each of the selected image content items;
- interface with a playback log indicating playback times of audio content items played on a playback device prior to the selected image content items being uploaded to the image repository, the playback device being associated with the capture device;
- correlate one or more of the captured image content items with one or more portions of the playback log based on the time of capture indicated by the metadata relating to the one or more captured content items and the playback times indicated by the playback log; and
- generate a media output as a collection of a plurality of the captured image content items stored at the network accompanied by audio content related to the portion of the playback log which is correlated with the captured image content items in the collection.

24. A non-transitory computer readable medium comprising computer readable instructions that, when executed on a computer, cause the computer to carry out a method of generating media content, the method comprising:
- receiving, at a network, still or moving image content items captured by a capture device, and image content metadata indicating a time of capture of each of the image content items;
- storing a playback log indicating playback times of audio content items provided to a user of the capture device prior to the receiving;
- correlating one or more of the captured image content items with one or more portions of the playback log based on the time of capture indicated by the metadata relating to the one or more captured content items and the playback times indicated by the playback log; and
- generating a media output as a collection of a plurality of the captured image content items stored at the network accompanied by audio content related to the portion of the playback log which is correlated with the captured image content items in the collection.

\* \* \* \* \*